(No Model.)
J. C. SEXTON.
SIDE SADDLE TREE.
No. 264,199. Patented Sept. 12, 1882.
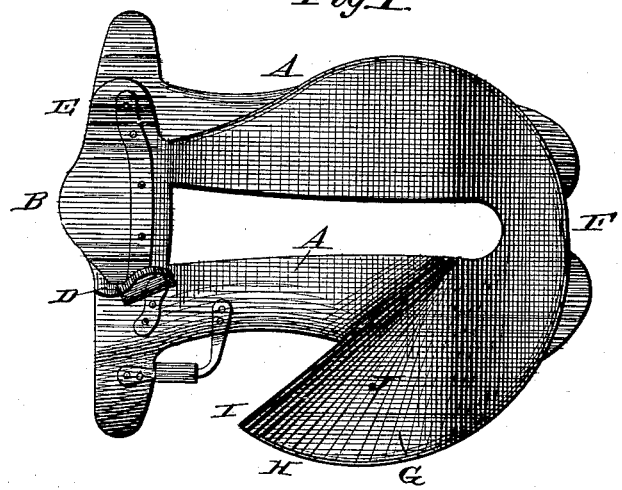
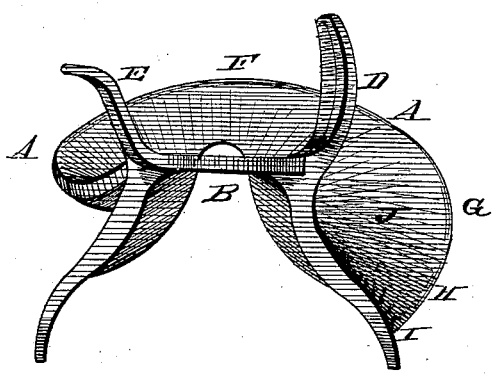
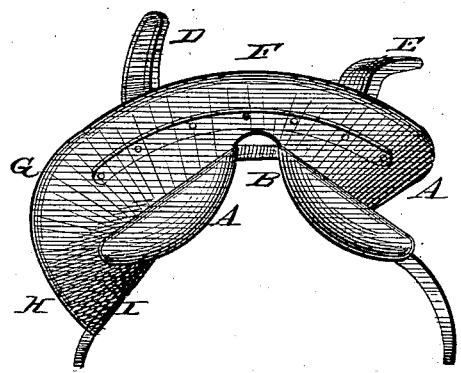
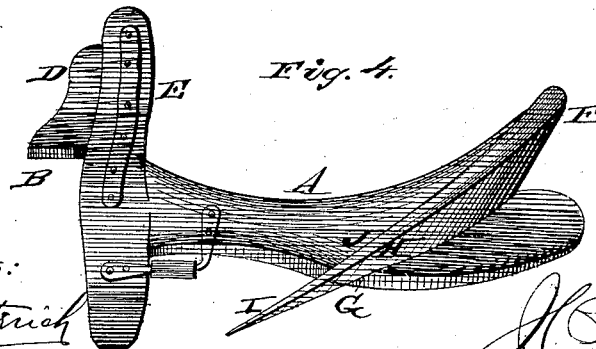
Witnesses:
Phil C Dietrich
J R Littell
Inventor
J C Sexton
by C A Snow & Co.
Attorneys

UNITED STATES PATENT OFFICE.

JOSEPH C. SEXTON, OF WYTHEVILLE, VIRGINIA.

SIDE-SADDLE TREE.

SPECIFICATION forming part of Letters Patent No. 264,199, dated September 12, 1882.

Application filed July 27, 1882. (No model.)

*To all whom it may concern:*

Be it known that I, JOSEPH C. SEXTON, of Wytheville, in the county of Wythe and State of Virginia, have invented certain new and useful Improvements in Side-Saddle Trees; and I do hereby declare that the following is a full, clear, and exact description of the invention, which will enable others skilled in the art to which it appertains to make and use the same, reference being had to the accompanying drawings, which form a part of this specification.

This invention relates to side-saddle trees, and has for its object to provide a simple, durable, inexpensive, and efficient construction, whereby the rider is enabled to sit more erect, so as to divide the weight, and thereby equalize the pressure on the horse's back.

To this end it consists in certain improvements in the construction and operation of the same.

In the drawings, Figure 1 is a top view of a saddle-tree embodying my improvements. Fig. 2 is a front end view; Fig. 3, a rear end view, and Fig. 4 a side view.

Referring to the drawings, A A designate the side bars, B the crook, D the near horn, E the off horn, and F the cantle, of an ordinary side-saddle tree. At the side of the stirrup and near horn D the cantle is extended outwardly and downwardly toward the front, as shown, to form a leg-rest, G, having a curved and rounded outer edge, H, tapering to a point or edge, I, some distance back of the stirrup-strap, and a smooth upper surface, J. The extension-rest G gradually diminishes in thickness toward the point I for purpose of elasticity; or it may be constructed of some elastic material and secured in any suitable manner to the side of the cantle. The top surface of the extension may be slightly concaved.

The operation and advantages of my invention will be readily understood. The extension serves to retain the rider more securely in the saddle the harder the foot is pressed on the stirrup, and supports the leg so that the muscles are not deadened by the weight of the body, the smooth upper surface and rounded edge presenting no sharp edges or projections to the leg. The rider is also enabled to sit firmer and more erect, so as to better divide the weight and equalize the pressure on the horse's back, while the position can be readily changed and the muscles relaxed without danger of an overthrow of equilibrium. The extension also adds to the strength and durability of the tree, and the convenience and comfort of the rider greatly increased.

I claim and desire to secure by Letters Patent—

1. In a side-saddle tree, the cantle having an extension forming a leg-support, curved outwardly and downwardly in front to a point in rear of the stirrup-strap, as set forth.

2. A side-saddle tree having the cantle extended outwardly and downwardly toward the front to form a leg-support on the stirrup side, having a curved and rounded outer edge, a smooth upper surface, and gradually diminishing in thickness toward its lower end, as set forth.

In testimony that I claim the foregoing as my own I have hereto affixed my signature in presence of two witnesses.

JOSEPH CAMPBELL SEXTON.

Witnesses:
JAS. H. MATNEY,
PASCHAL BUFORD.